(12) United States Patent
Mah

(10) Patent No.: US 9,266,376 B1
(45) Date of Patent: Feb. 23, 2016

(54) SYSTEM AND METHOD FOR AUTOMATIC PAGE TURNING FOR BOOK IMAGING

(71) Applicant: Kenneth Jack Mah, Edmonton (CA)

(72) Inventor: Kenneth Jack Mah, Edmonton (CA)

( * ) Notice: Subject to any disclaimer, the term of this patent is extended or adjusted under 35 U.S.C. 154(b) by 0 days.

(21) Appl. No.: 14/681,399

(22) Filed: Apr. 8, 2015

Related U.S. Application Data

(60) Provisional application No. 61/981,773, filed on Apr. 19, 2014.

(51) Int. Cl.
*G10G 7/00* (2006.01)
*B42D 9/00* (2006.01)
*H04N 5/232* (2006.01)
*B42D 9/04* (2006.01)

(52) U.S. Cl.
CPC .. *B42D 9/00* (2013.01); *B42D 9/04* (2013.01); *H04N 5/23203* (2013.01)

(58) Field of Classification Search
CPC ..................................... B42D 9/04; B42D 9/00
See application file for complete search history.

(56) References Cited

U.S. PATENT DOCUMENTS

| | | |
|---|---|---|
| 3,939,587 A | 2/1976 | Weststrom |
| 4,031,644 A | 6/1977 | Rogers |
| 4,102,071 A | 7/1978 | D'Arcy |
| 4,567,528 A | 1/1986 | Wilman |
| 4,663,873 A | 5/1987 | Shinbrot |
| 4,673,286 A | 6/1987 | Shinbrot |
| 4,870,258 A | 9/1989 | Mochizuki |
| 4,916,839 A | 4/1990 | Nakanishi |
| 4,942,482 A * | 7/1990 | Kakinuma ........... G03B 27/625 355/25 |
| 5,471,277 A * | 11/1995 | Fujioka .................... B42D 9/04 355/25 |
| 5,612,791 A | 3/1997 | Turner |
| 5,640,252 A | 6/1997 | Turner |
| 5,760,925 A | 6/1998 | Saund |
| 7,430,035 B2 * | 9/2008 | Iossiger ................... B42D 9/04 355/25 |
| 8,017,848 B2 | 9/2011 | Manera |
| 8,646,193 B1 * | 2/2014 | Li ............................ B42D 9/06 40/533 |
| 8,796,526 B2 * | 8/2014 | Kanda ..................... B41J 3/283 84/486 |
| 9,077,827 B2 * | 7/2015 | Matsuda .................. B42D 9/04 |

FOREIGN PATENT DOCUMENTS

| | | |
|---|---|---|
| CN | 101854460 B | 5/2013 |
| EP | 1438835 B2 | 7/2004 |

* cited by examiner

*Primary Examiner* — Robert W Horn

(57) ABSTRACT

A system and method for automatically turning the pages of an open book (80) without user intervention for the purposes of digital imaging or viewing. One embodiment of the system includes a rotating platform (15) for mounting the open book (80), a page lifter (51), a transparent stationary hood (62), and a camera (201). As the platform (15) rotates, the page lifter (51) is dropped onto the uppermost page on the leading side of the book (80). The uppermost page is held fast and lifted up by the page lifter (51). The platform (15) continues to rotate, peeling the uppermost page free from the page lifter (51) and eventually trapping the book completely under the hood (62) which holds the book (80) open and keeps the uppermost pages visible. The platform (15) rotation is paused momentarily to allow for image capture by a camera (201) viewing the open book (80) through the hood (62). Other embodiments are described and shown.

19 Claims, 10 Drawing Sheets

SYSTEM AND METHOD FOR AUTOMATIC PAGE TURNING FOR BOOK IMAGING

CROSS-REFERENCE TO RELATED APPLICATIONS

This application claims the benefit of provisional patent application No. 61/981,773 filed Apr. 19, 2014 by the present inventor.

FEDERALLY SPONSORED RESEARCH

None.

SEQUENCE LISTING

None.

BACKGROUND-PRIOR ART

The following is a tabulation of some prior art that presently appears relevant:

| U.S. patents | | | |
|---|---|---|---|
| Pat. No. | Kind Code | Issue Date | Patentee |
| 3,484,970 | A | Dec. 23, 1969 | Berlinsky |
| 3,550,296 | A | Dec. 29, 1970 | Castagna |
| 3,800,453 | A | Apr. 2, 1974 | Kroes |
| 3,939,587 | A | Feb. 24, 1976 | Weststrom |
| 4,031,644 | A | Jun. 28, 1977 | Rogers |
| 4,102,071 | A | Jul. 25, 1978 | D'Arcy |
| 4,567,528 | A | Jan. 28, 1986 | Wilman et al. |
| 4,663,873 | A | May 12, 1987 | Shinbrot |
| 4,673,286 | A | Jun. 16, 1987 | Shinbrot |
| 4,870,258 | A | Sep. 26, 1989 | Mochizuki et al. |
| 4,916,839 | A | Apr. 17, 1990 | Nakanishi |
| 4,942,482 | A | Jul. 17, 1990 | Kakinuma et al. |
| 5,471,277 | A | Nov. 28, 1995 | Fujioka at al. |
| 5,612,791 | A | Mar. 18, 1997 | Turner et al. |
| 5,640,252 | A | Jun. 17, 1997 | Turner at al. |
| 5,760,925 | A | Jun. 2, 1998 | Saund et al. |
| 8,017,848 | B2 | Sep. 13, 2011 | Manera |

| Foreign patent Documents | | | | |
|---|---|---|---|---|
| Foreign Doc. No. | Country | Kind Code | Pub. Date | Patentee |
| EP 1438835 | European Union | B2 | Jul. 21, 2004 | Mandel et al. |
| CN101854460 B | China | B | May 15, 2013 | Peng Xuan |

Many public and private institutions have a need to digitize their large collections of books and bound documents. Digitizing such documents would reduce the cost of providing and maintaining physical storage space required for the documents and would allow the document contents to be made widely available over computer networks. Traditional digitization of books using a standard flatbed scanner requires manual intervention for turning individual pages during the digitization process. Manually turning the pages and scanning each page of a book is labor intensive and time-consuming.

Accordingly, there is a need for a system capable of reliably converting large numbers of bound document pages into digital files. Various devices and systems exist but they are generally mechanically complex and costly. Various devices for automatically turning the pages of a book are known in the art. U.S. Pat. No. 3,484,970 to Berlinsky et al. (1969) shows an automatic sheet turner using a rotating vacuum head. U.S. Pat. No. 3,550,296 to Castagna (1970) shows a page turning device using pivoted suction arms. U.S. Pat. No. 4,916,839 to Nakanishi (1990) shows a page turning method and apparatus using a friction member to buckle an uppermost page. European Patent No. EP 1 438 835 B2 to Mandel et al. (2002) shows a book page turning system including a system for flattening and holding the pages of the open book. Chinese Patent No. CN101854460 B to Peng Xuan (2013) shows a dual book scanning system using a rotating glass sheet and four elevator platforms which press the books against the glass sheet.

The aforementioned devices and systems are generally mechanically complex and expensive. There is a need for an affordable solution which can be purchased by smaller institutions or individuals, such as researchers.

SUMMARY

In accordance with one embodiment, a system and method for automatically turning the pages of an open book without user intervention for the purposes of digital imaging or viewing. One embodiment of the system includes a rotating platform, an adhesive page lifter, a transparent stationary hood, and a camera. The open book is mounted face-up onto the platform with its leading edge substantially coincident with a radial line originating from the center of the platform. As the platform rotates, the page lifter is dropped onto the uppermost page on the leading side. The uppermost page is held fast by the page lifter. The platform rotates incrementally, causing the uppermost page to curl away and separate from the neighboring pages. The page lifter and uppermost page are lifted up as the platform rotates. The platform continues to rotate, moving the book away from the page lifter. Eventually, the uppermost page is peeled free from the page lifter. As the platform continues to rotate, the free page encounters the edge of the hood and the free page is forced down. The platform continues to rotate, trapping the book completely under the hood which holds the book open and keeps the uppermost pages visible. The platform rotation is paused momentarily to allow for image capture by a camera viewing the open book through the hood.

Some embodiments of the system require only a single motor and minimal mechanical parts resulting in reduced cost and increased reliability. The estimated system cost is sufficiently low that individual consumers can afford to purchase it.

DRAWINGS

DETAILED DESCRIPTION

FIGS. 1-6—First Embodiment

Figure 1:
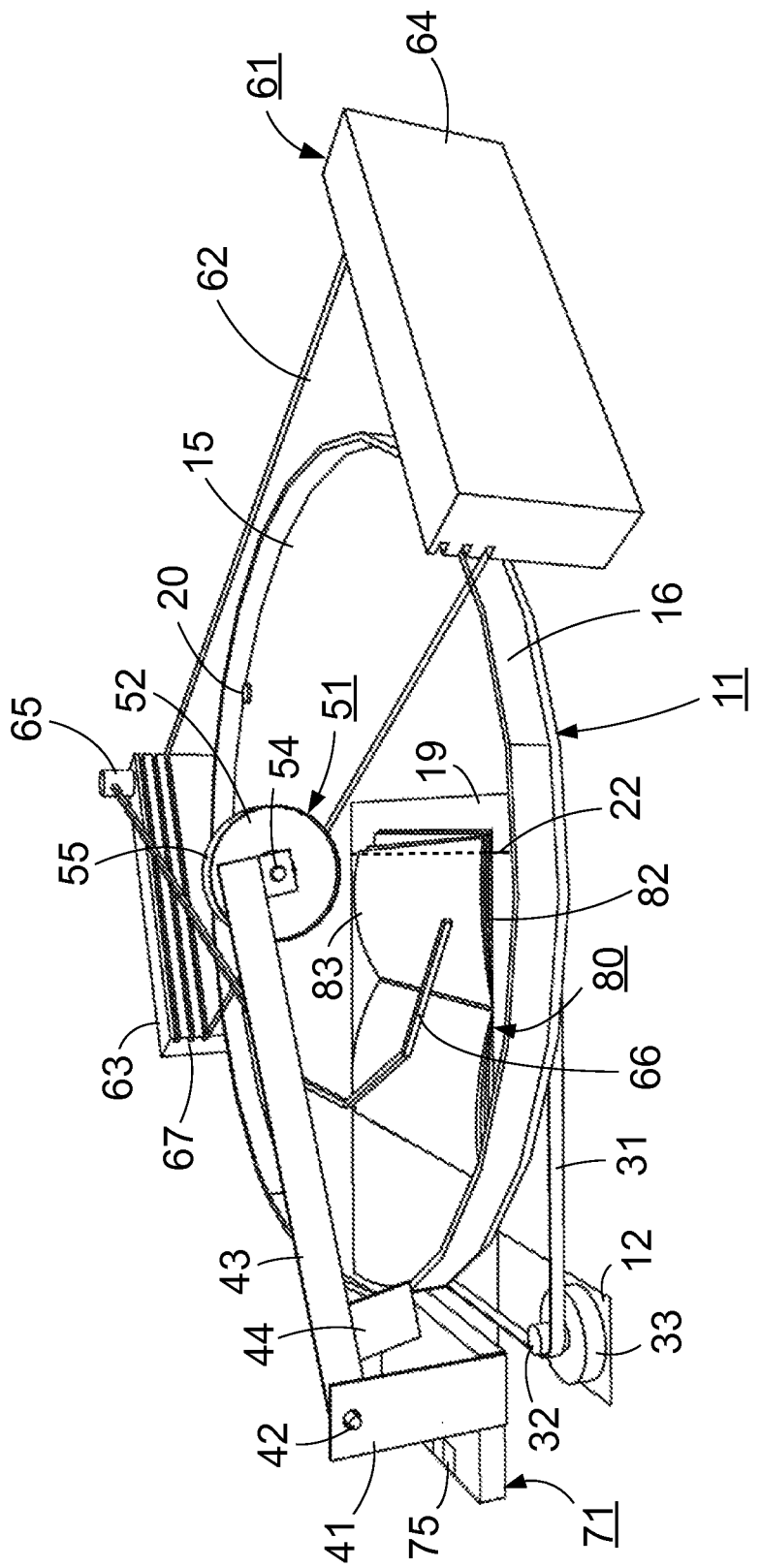
FIG. 1 is a perspective front view of an embodiment of the page turning system.
Figure 2:
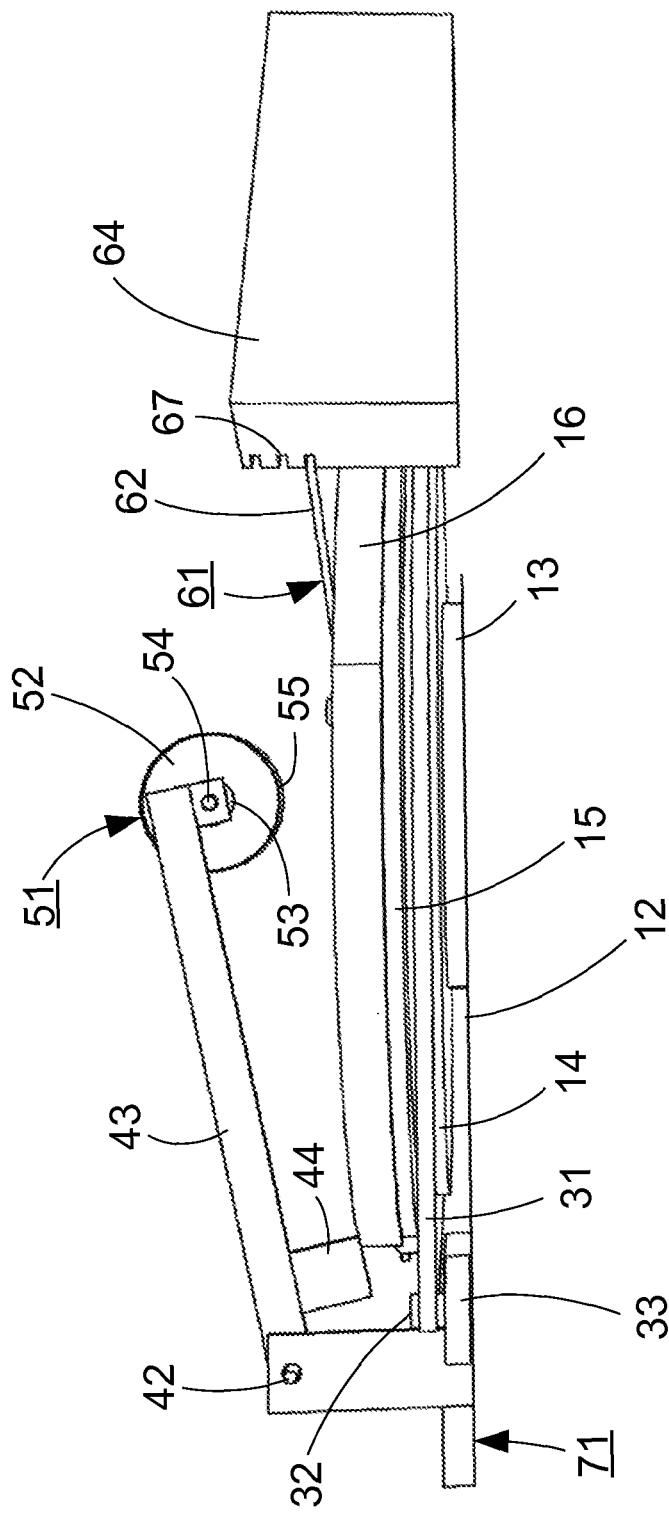
FIG. 2 is a front view of the embodiment of FIG. 1.
Figure 3:
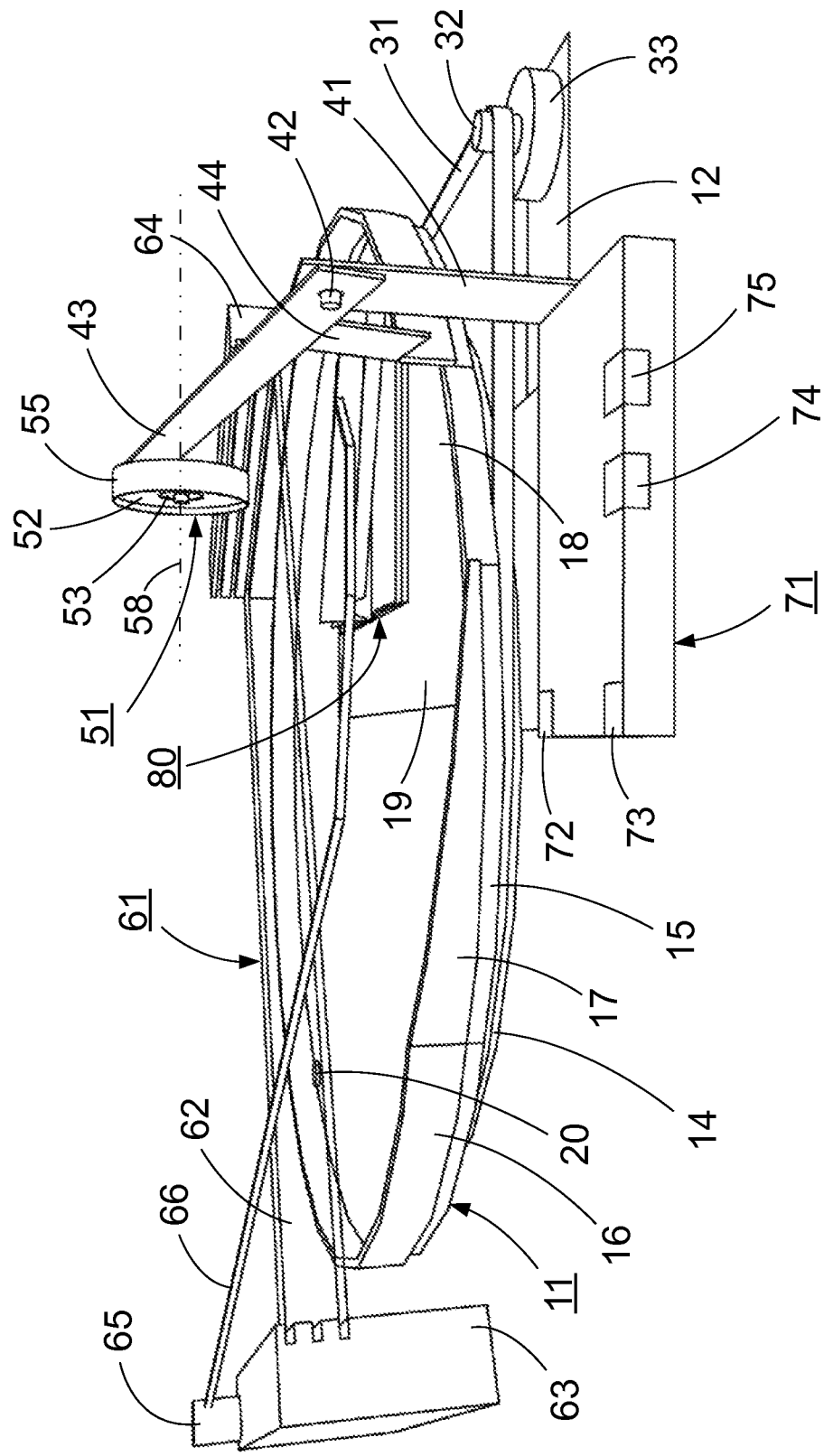
FIG. 3 is a perspective left-side view of the embodiment of FIG. 1.
Figure 5:
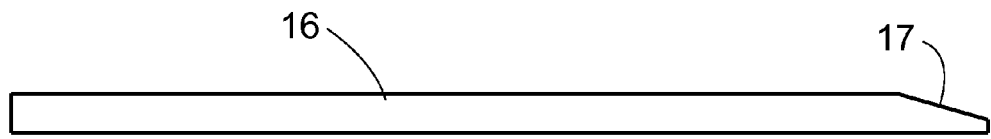
FIG. 5 is a front view of the rim laid out flat.

FIGS. 1-3 are views of the page turning system constructed in accordance with one embodiment. A turntable 13 is fixed on top of a rigid base 12. The base 12 may rest atop a floor or a table. The turntable 13 has a first center axis 21. A platform sheave 14 of predetermined diameter is fixed to the top of the turntable 13. A circular platform 15 of predetermined diameter is mounted to the top of the platform sheave 14 such that the platform 15 rotates about the first center axis 21. The platform 15 may be made of wood, plastic, or glass, for example. An index magnet 20 is fixed to the top of the platform at a predetermined location near the edge of the platform 15. The platform 15 has a circumferential rim 16. The rim 16 is made of a sufficiently rigid non-ferrous material such as aluminum or plastic. The rim 16 has a predetermined height profile which includes a gap section 18 and a ramp section 17. If the rim 16 was removed from the platform 15 and flattened, it would appear as shown in FIG. 5. The length of the rim 16 is insufficient to encompass the circumference of the platform 15 resulting in the gap section 18.

A steel sheet 19 is fixed to the top of the platform. A plurality of strong disc magnets (not shown) are magnetically engaged to the exposed surface of the steel sheet 19. An alignment line 22 is marked on the steel sheet extending radially from the center of the platform 15 towards the edge of the platform 15. The turntable 13, platform sheave 14, platform 15, steel sheet 19, index magnet 20, and rim 16 form the platform assembly 11.

A motor 33 is fixed to the base 12 a predetermined distance from the platform 15. The motor 33 has a rotatable shaft and a drive sheave 32 is fixed to the shaft. The drive sheave 32 drives the platform sheave 14 through a flexible belt 31. The drive sheave 32, flexible belt 31, and platform sheave 14 are a means for transferring rotational energy from the motor 33 to the platform 15.

A post 41 is mounted to the base 12. A pickup arm 43 is pivotally mounted to the post 41. The pickup arm 43 freely pivots in the vertical direction about a pivot 42. The pivot 42 defines a pivot axis. The pickup arm 43 is made of a length of sheet metal or plastic such that the pickup arm 43 may flex slightly within a plane containing the pivot axis. An axle 54 is mounted to the free end of the pickup arm 43. Axle 54 defines a second center axis 58 which is parallel to the pivot axis.

Figure 4:
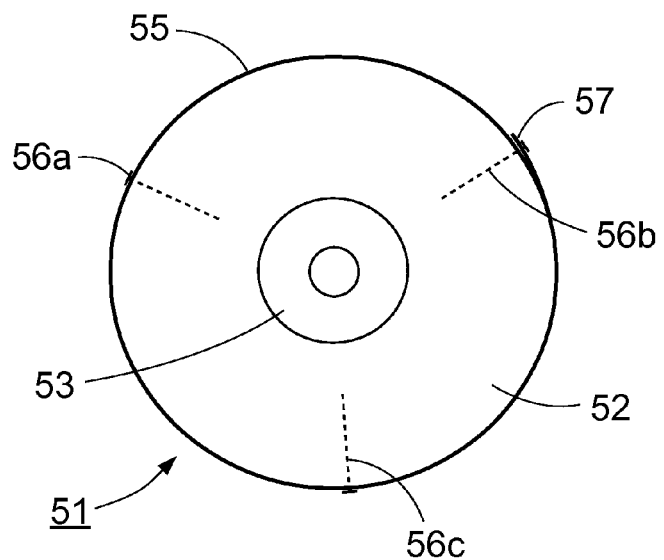
FIG. 4 is a front view of the page lifter.

Refer to FIG. 4. A wheel or disc 52 of predetermined diameter with a bearing 53 at its center is rotatably mounted to the axle 54. The disc 52 is made of a substantially resilient material such as, but not limited to, rubber, foam rubber, or cork. A plurality of pins 56 holds a loop of pressure-sensitive adhesive tape 55 to the circumference of the disc 52. The adhesive on the adhesive tape 55 faces outward, away from the axle 54. The ends of the adhesive tape 55 form an overlap 57. The thickness of the disc 52 is substantially less than the width of the adhesive tape 55. The adhesive tape 55 may be, for example, masking tape exhibiting a moderate adhesive. The bearing 53, disc 52, adhesive tape 55, and pins 56, form a page lifter 51.

The position of the post 41 and the length of the pickup arm 43 are such that when the pickup arm 43 is substantially horizontal, the axle 54 and first center axis 21 are contained within a common plane and the page lifter 51 is located substantially midpoint between the first center axis 21 and the rim 16.

The pickup arm 43 has a boss 44 feature located where the pickup arm 43 crosses over the rim 16. The mass of the page lifter 51 forces the pickup arm 43 down, allowing the boss 44 to maintain contact with the rim 16. The pickup arm 43, page lifter 51, pivot 42, and rim 16 form a simple class 3 lever where the pivot 42 is the fulcrum, the rim 16 provides the effort, and the page lifter 51 is the resistance.

A first riser 63 and a second riser 64 suspend a hood 62 above a portion of the platform assembly 11 opposite the post 41. The risers 63,64 are engaged to the floor or table. The risers 63,64 may be made of materials such as, but not limited to, wood or plastic. The risers 63,64 have a plurality of horizontal slots 67. The hood 62 is ideally, but not essentially, a transparent glass sheet. The hood 62 may be made of other materials such as, but not limited to, plastic or wire mesh. The edges of the hood 62 are friction fitted into the slots 67 in the risers 63,64. The horizontal slots 67 allow the hood 62 to be suspended horizontally at one of several discrete predetermined heights above the platform assembly 11.

A turret 65 is friction-fitted into the top of the first riser 63 situated furthest from the page lifter 51. A flexible restraining arm 66 is fixed to the turret 65. The restraining arm 66 may be made of non-ferrous materials such as, but not limited to, wire or plastic. The restraining arm 66 may be adjusted such that the free end of the restraining arm 66 touches the platform 15 at a point below the pickup arm 43 and close to the page lifter 51.

Figure 6:
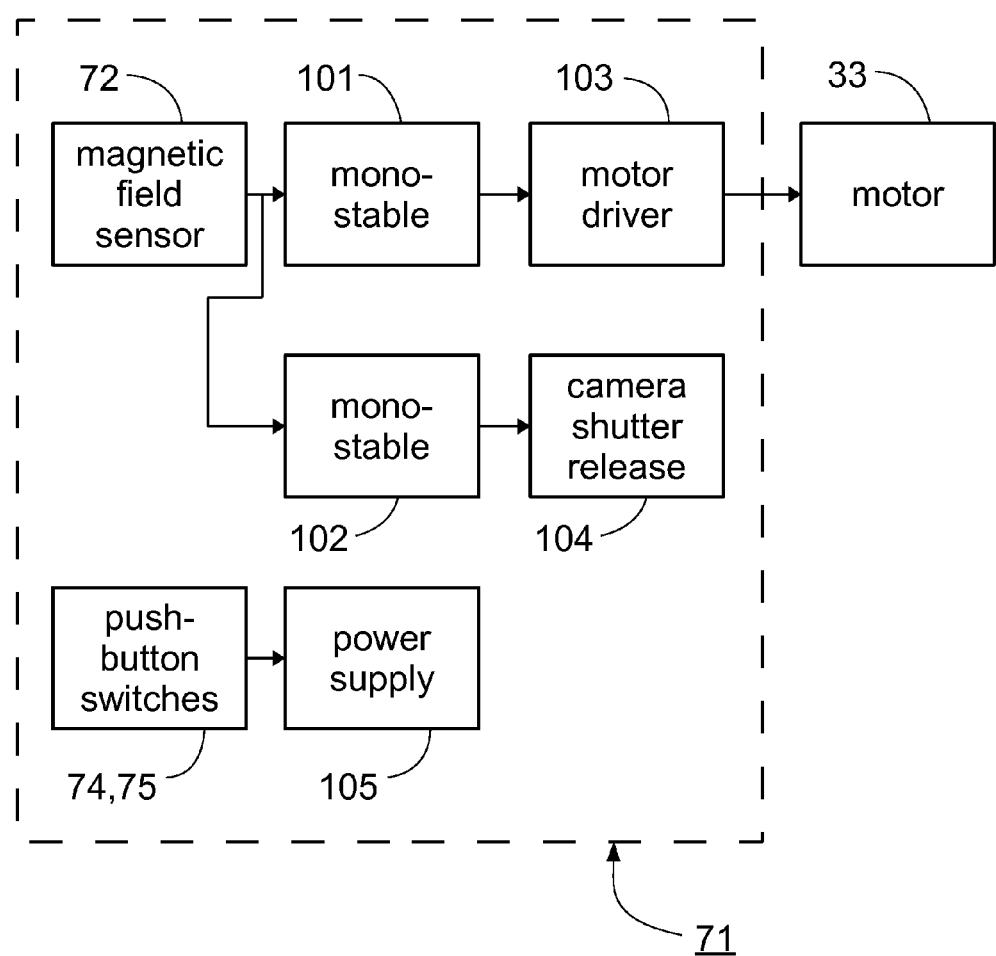
FIG. 6 is a block diagram of the system electronics.

Refer to FIG. 6. A power supply 105 supplies power to a controller 71 which is fixed to the base 12. The power supply 105 is powered by a conventional AC power adapter (not shown) or batteries (not shown). Push-button switches 74,75 control the flow of power to the controller 71.

The controller 71 contains a magnetic field sensor 72 such as a hall-effect sensor or a magnetic reed switch. The magnetic field sensor 72 is positioned close to the edge of the platform 15. The magnetic field sensor 72 is capable of detecting the index magnet 20 when the platform 15 is rotated to a predetermined orientation.

The output of the magnetic field sensor 72 is connected to a first monostable multivibrator 101 or pulse generator. The first monostable multivibrator 101 is connected to a motor driver 103. The motor driver 103 is connected to the motor 33.

The output of the magnetic field sensor 72 is also connected to a second monostable multivibrator 102. The output of the second monostable multivibrator 102 is connected to a standard remote camera shutter release module 104 or equivalent electronic circuit. The remote camera shutter release module 104 contains an infrared light emitting diode (LED) which is aimed through a window 73 towards the space above the platform assembly 11. The window 73 is transparent to infrared light.

An imaging device such as a camera 201 is mounted to a tripod (not shown). The tripod is engaged with the floor or table. The camera 201 is positioned above the hood 62 as shown in FIG. 7F. The camera 201 is capable of being triggered by a predetermined infrared signal from the remote camera shutter release module 104 or equivalent electronic circuit.

REFERENCE NUMERALS 11 platform assembly
12 base
13 turntable
14 platform sheave
15 platform
16 rim
17 ramp section
18 gap section
19 steel sheet
20 index magnet
21 first center axis
22 alignment line
31 flexible belt
32 drive sheave
33 motor
34 rotary encoder
41 post
42 pivot
43 pickup arm
44 boss
45 servo motor
51 page lifter
52 disc
53 bearing
54 axle
55 adhesive tape
56 pin
57 overlap
58 second center axis
61 hood assembly
62 hood
63 first riser
64 second riser
65 turret
66 restraining arm
67 slot
71 controller
72 magnetic field sensor
73 window
74 "run" push-button switch
75 "stop" push-button switch
80 book
81 front cover
82 back cover
83 uppermost leading page
91 shroud
92 hollow axle
93 hollow wheel
94 opening
95 counterweight
96 anchor point
97 wheel
98 tire
99 slot
101 first monostable multivibrator
102 second monostable multivibrator
103 motor driver
104 camera shutter release module
105 power supply
120 transducer
121 amplifier
122 servo motor driver
123 microcontroller
124 electronic switch
201 camera/imaging device Operation

FIGS. 1-7

Refer to FIG. 1. A book 80 to be scanned has pages, a spine, a front cover 81, and a back cover 82. The pickup arm 43 is manually rotated to a vertical position and the restraining arm 66 is manually rotated clear of the platform 15 so as not to obstruct the operator while mounting the book 80. The platform 15 is manually rotated to its setup position such that, when viewed from above, the alignment line 22 is at the 6 o'clock position as shown in FIG. 1.

The open book 80 is mounted to the platform 15 using the disc magnets to hold the front cover 81 and back cover 82 against the steel sheet 19. When opened normally, the book 80 has left-hand pages and an uppermost leading page 83 on the right-hand side. The open book 80 is oriented such that the rightmost portion of the back cover 82 is substantially coincident with the alignment line 22. The disc magnets and steel sheet 19 are a means for retaining the open book 80 in an initially set position on the platform 15.

The position of the hood assembly 61 is adjusted such that the hood 62 covers the right-hand portion of the platform 15 from approximately the 11 o'clock to 5 o'clock position. The book 80 is opened to a desired starting page and then the restraining arm 66 is adjusted such that its free end is positioned above the spine of the book 80.

The operator activates the system by pressing the "run" push-button switch 74 which causes the controller 71 to apply power to the motor 33. The platform assembly 11 rotates counter-clockwise until the index magnet 20 is adjacent to the magnetic field sensor 72 which triggers the first monostable multivibrator 101 (long delay) and the second monostable multivibrator 102 (short delay). The first monostable multivibrator 101 causes the motor driver 103 to temporarily suspend electrical power delivery to the motor 33. When the platform assembly 11 is paused in this position, the open book 80 is positioned in front of the camera 201 and the camera 201 is aimed at the open book 80. After a short time delay to allow the platform 15 time to stop rotating due to inertia, the second monostable multivibrator 102 activates the remote camera shutter release module 104 which triggers the camera 201 to capture an image of the open book 80. After a time delay to allow for image capture, first monostable multivibrator 101 expires and power is resupplied to the motor 33. The controller 71 is an electronic means for controlling motorized rotation of the platform 15. The controller 71, motor 33, drive sheave 32, flexible belt 31, and platform sheave 14 are a means for controllably transferring rotational energy from the motor 33 to the platform 15.

The operator rotates the pickup arm 43 from its vertical position to a substantially horizontal position. Gravity causes the pickup arm 43 to rotate about the pivot 42, forcing the boss 44 into contact with the rim 16. The rim 16 has a predetermined height profile such that as the platform 15 rotates counter-clockwise, the pickup arm 43 is moved down and up in a cyclical pattern, one cycle per platform 15 revolution. Specifically, as the platform 15 rotates counter-clockwise, the boss 44 encounters the gap section 18 on the rim. The gap section 18 provides no vertical support to the boss 44 so the pickup arm 43 drops until the page lifter 51 contacts the steel sheet 19 at a location adjacent to the alignment line 22. As the platform 15 continues to rotate, the boss 44 contacts the ramp section 17 on the rim 16 and the page lifter 51 is lifted up, beyond the level of the hood 62. If an open book 80 is mounted to the platform 15, the page lifter 51 adheres to the uppermost leading page 83 of the book 80 instead of impacting the steel sheet 19 as described above.

Figure 7A:
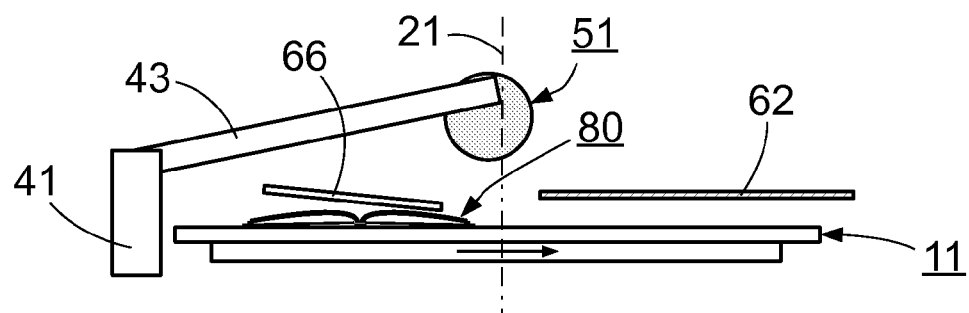
FIG. 7A is a simplified front view of the embodiment of FIG. 1 in the "pre-impact" stage.
Figure 7B:
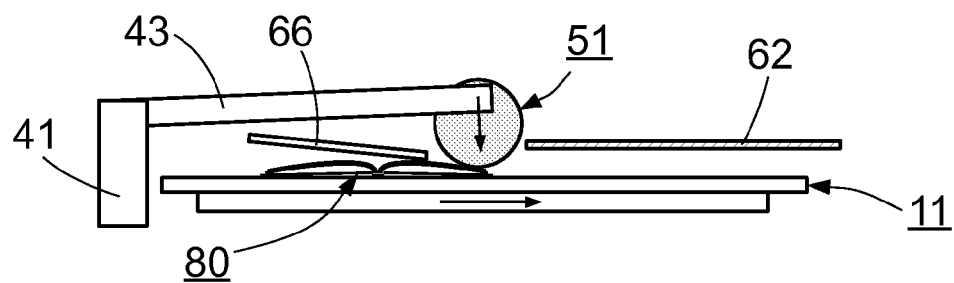
FIG. 7B is a simplified front view of the embodiment of FIG. 1 in the "impact" stage.
Figure 7C:
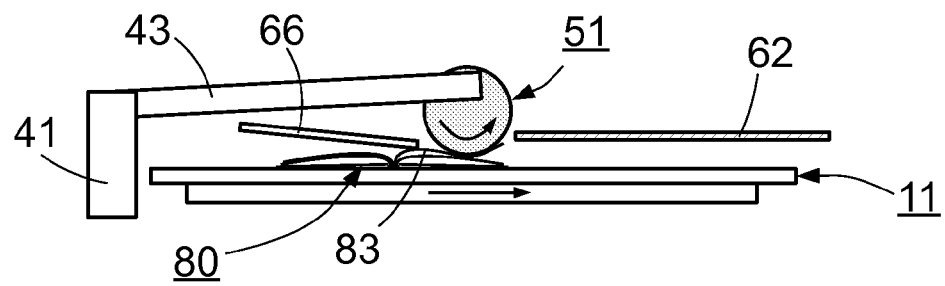
FIG. 7C is a simplified front view of the embodiment of FIG. 1 in the "roll" stage.
Figure 7D:
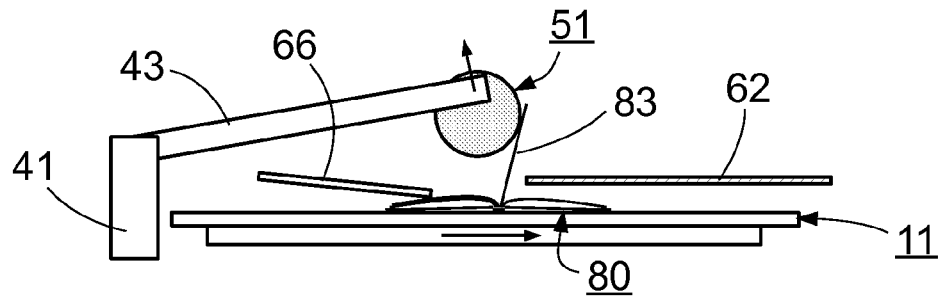
FIG. 7D is a simplified front view of the embodiment of FIG. 1 in the "pickup" stage.
Figure 7E:
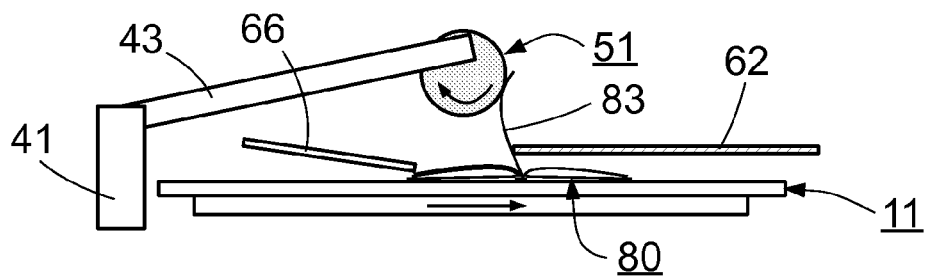
FIG. 7E is a simplified front view of the embodiment of FIG. 1 in the "release" stage.
Figure 7F:
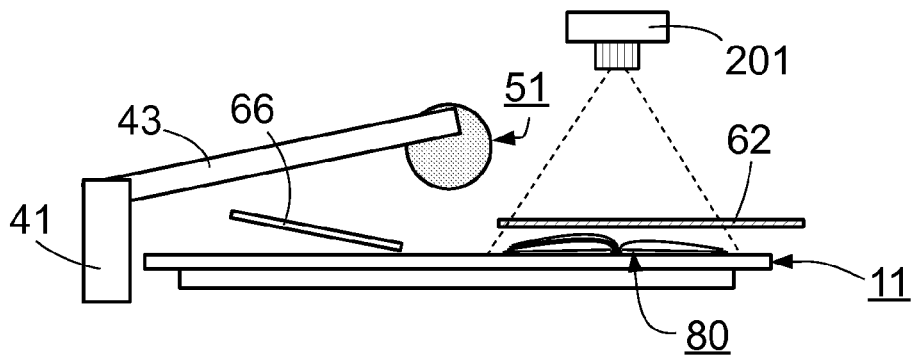
FIG. 7F is a simplified front view of the embodiment of FIG. 1 in the "image capture" stage.

FIGS. 7A-7F show a sequence of simplified front views of the embodiment where the rim 16 is omitted for clarity. The steps involved in turning a page are detailed as follows: FIG. 7A shows the "pre-impact" stage where the book 80 is approaching the page lifter 51. The hood 62 and restraining arm 66 prevent the pages from inadvertently flipping as the platform 15 rotates. The underside of the hood 62 and the underside of the restraining arm 66 are smooth which prevents the pages in contact with the underside from folding due to friction. As the book 80 passes underneath the restraining arm 66, the book 80 displaces the restraining arm 66, flexing the restraining arm 66 upward. The restraining arm 66 material is non-magnetic so that it is not inadvertently attracted to the disc magnets holding the book's front cover 81 and back cover 82 to the steel sheet 19. The hood 62 and restraining arm 66 are a means for restraining the pages while said platform is being rotated from a first predetermined rotational angle to a second predetermined rotational angle.

The platform 15 rotates counter-clockwise with the boss 44 in continuous contact with the rim 16 until the boss 44 encounters the gap section 18 on the rim 16. At this instant, the page lifter 51 drops onto the uppermost leading page 83 as shown in FIG. 7B because the pickup arm 43 has lost the support of the rim 16. Because the page lifter 51 and pickup arm 43 have significant mass, the page lifter 51 deforms upon impact creating a significant contact area between the adhesive tape 55 and the uppermost leading page 83. The adhesive tape 55 adheres to the uppermost leading page 83. The contact area moves in a curved path in the horizontal plane because the platform 15 rotates about the first center axis 21. As the platform 15 rotates, the flexible pickup arm 43 bends in concert with the curved path of the contact area, preventing the page lifter 51 from prematurely releasing the uppermost leading page 83.

As the platform 15 rotates, the page lifter 51 rolls counter-clockwise and the uppermost leading page 83 curls up as shown in FIG. 7C. The curling action of the uppermost leading page 83 helps separate the uppermost leading page 83 from any pages clinging to its underside. Simultaneously, due to the mass of the page lifter 51 and pickup arm 43, the bottom of the page lifter 51 contacts and adheres to new areas on the uppermost leading page 83.

As the platform 15 continues to rotate, the boss 44 contacts the inclination or ramp section 17 on the rim 16 which forces the page lifter 51 upward as shown in FIG. 7D. Due to the shape of the rim 16, the page lifter 51 is maintained at a predetermined level above the hood 62 until the next encounter with the gap section 18. The rim 16, post 41, pivot 42, pickup arm 43, and boss 44, are a means for raising and lowering the page lifter 51 based on the rotational angle of the platform 15.

As the platform 15 continues to rotate, the uppermost leading page 83 is drawn away from the page lifter 51 as shown in FIG. 7E. The page lifter 51 is free to rotate clockwise, reducing its hold on the uppermost leading page 83. Eventually, the adhesive force of the adhesive tape 55 is overcome by the rotational force of the motor 33 and the uppermost leading page 83 is peeled free from the page lifter 51. The moderate adhesive allows the adhesive tape 55 to be easily removed without damaging the pages. As the platform 15 continues to rotate, the freed uppermost leading page 83 encounters the edge of the hood 62 and the page is forced down onto the left-hand side of the book 80. Thus the page has been turned.

The platform 15 continues to rotate counter-clockwise until the index magnet 20 is substantially next to the magnetic field sensor 72 which informs the controller 71 that the book 80 is in the correct position for image capture. The hood 62 and restraining arm 66 are a means for restraining the uppermost pages of the book 80 as the platform 15 rotates. The hood 62 and restraining arm 66 are not required for some books, especially magazines, which have uppermost pages which require no restraint because their pages naturally lie flat.

The controller 71 pauses the motor 33 rotation and activates the remote camera shutter release module 104 which triggers the camera 201 to capture an image. FIG. 7F shows this final step in the sequence of steps required to turn a page and capture an image. The controller 71, magnetic field sensor 72, index magnet 20, and remote camera shutter release module 104 are a means for generating a wireless signal dependent on the rotational angle of the platform 15. The controller 71, magnetic field sensor 72, index magnet 20, and remote camera shutter release module 104 are also a means for controlling an image capture device dependent on the rotational angle of the platform 15.

The cycle is automatically repeated until the operator deactivates the system by pressing the "stop" push-button switch 75. The adhesive tape 55 eventually loses its stickiness so it is replaced every few hundred cycles or typically, once per book. The page lifter 51 may be detached from the axle 54 so that the operator may replace the loop of adhesive tape 55.

FIGS. 8-11

Additional Embodiments

Figure 10:
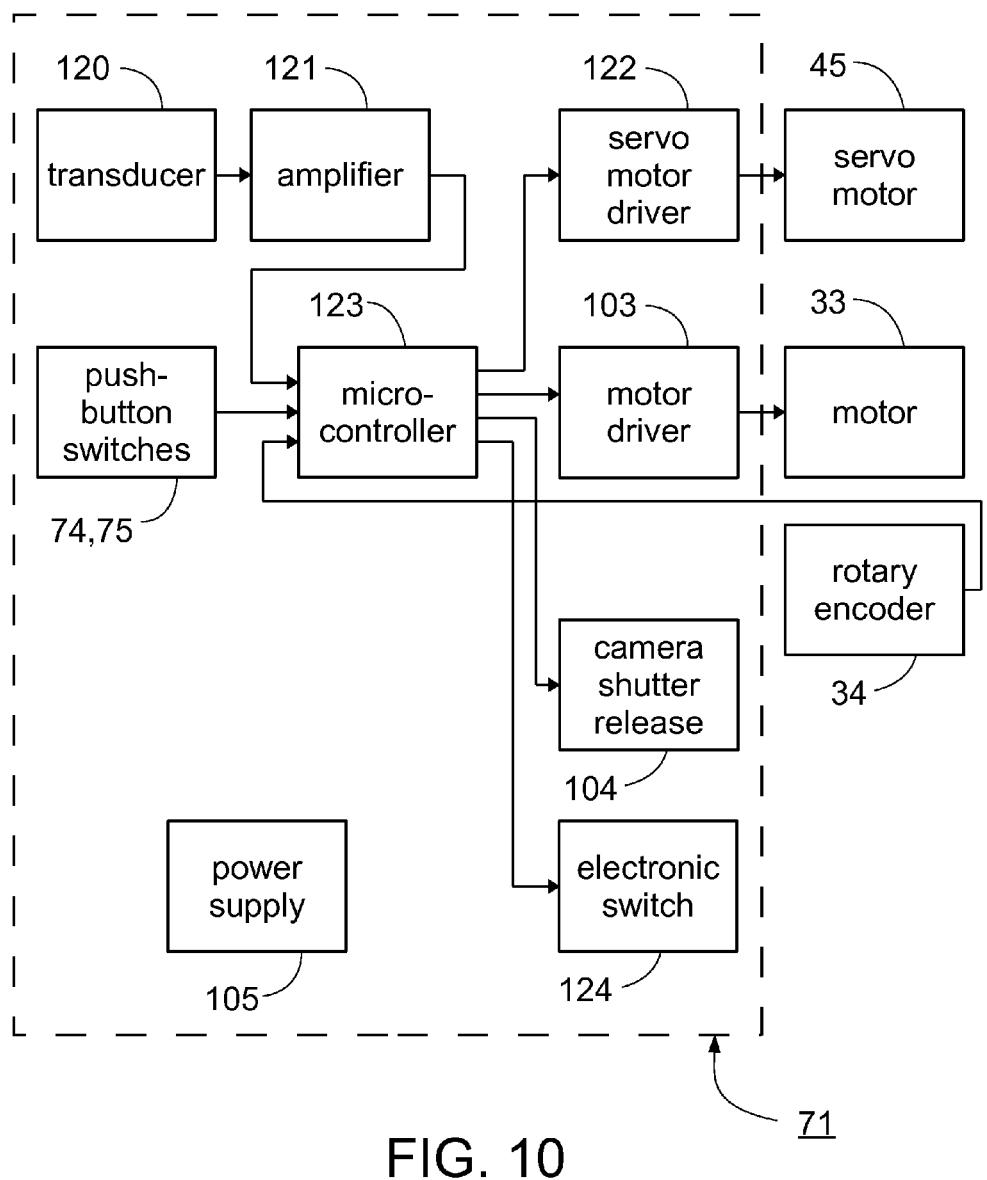
FIG. 10 is a block diagram of an alternate embodiment of the system electronics using a microcontroller.

Another embodiment uses a microcontroller 123 and a servo motor 45 to control the pickup arm 43. See FIG. 8 and FIG. 10. The platform 15 is outfitted with a rotary encoder 34 or shaft encoder which is connected to an input of the microcontroller 123. The microcontroller 123 controls a platform motor driver 103, a servo motor driver 122, a remote camera shutter release module 104, and an electronic switch 124 such as an electromechanical relay, transistor, or similar electronic circuit. The platform motor driver 103 powers the motor 33 connected to the platform 15. The servo motor driver 122 powers a servo motor 45 connected to the pickup arm 43.

Figure 11:
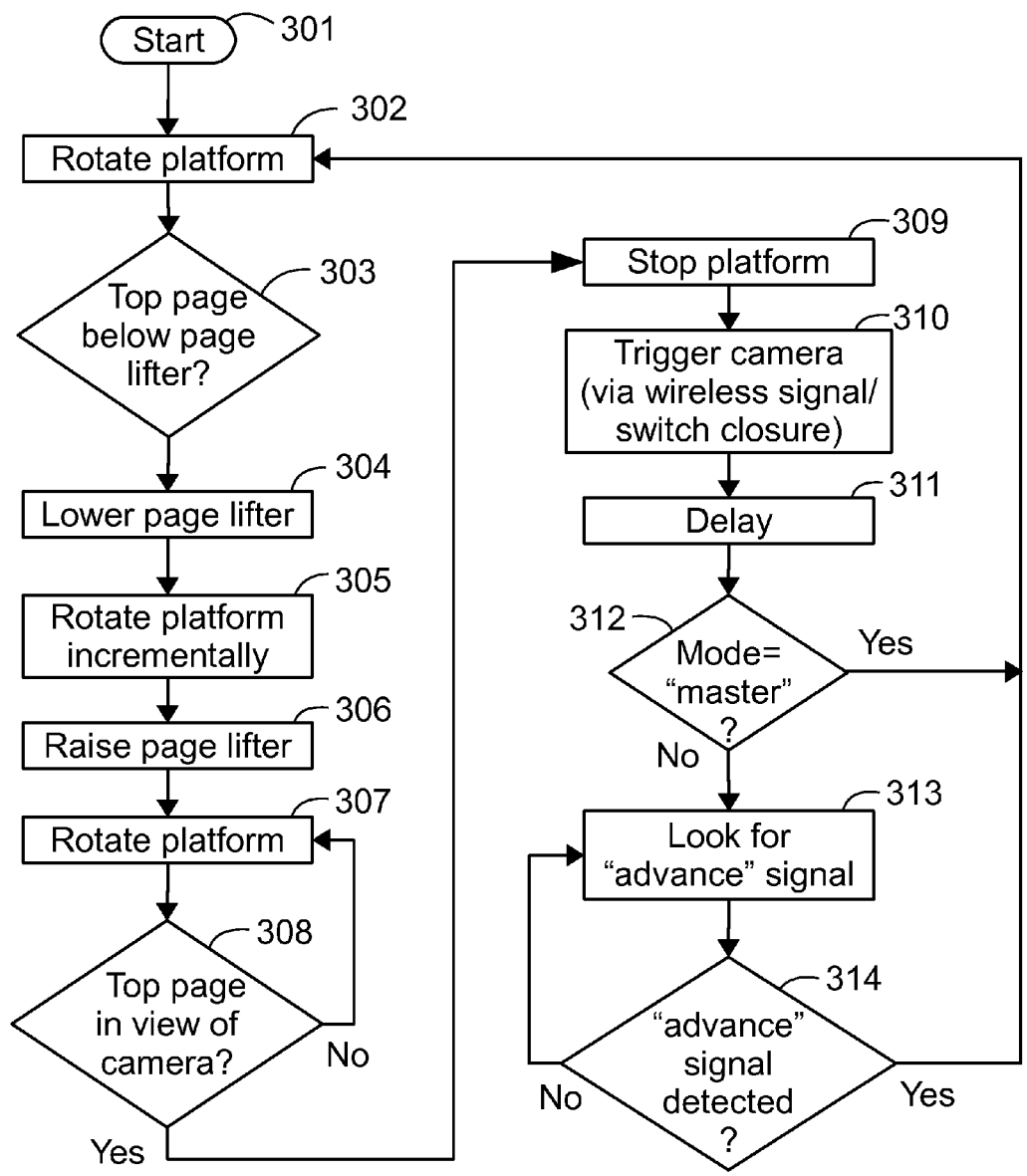
FIG. 11 is a flowchart of the microcontroller's program code.

Operation is as follows: Refer to the steps in the flowchart illustrated in FIG. 11. The pickup arm 43 is initially held at a predetermined height above the platform 15 by the servo motor 45. The motor driver 103 rotates the platform 15 (step 302). The rotary encoder 34 converts the angular position of the platform 15 to an analog signal or digital code which can be read by the microcontroller 123.

Based on the rotary encoder 34 output, when the microcontroller 123 determines that the uppermost leading page 83 of the book 80 is in the correct position (step 303), the servo motor 45 rotates the pickup arm 43 in a first direction causing the page lifter 51 to be lowered onto the uppermost leading page 83 (step 304). The platform 15 continues to rotate causing the page lifter 51 to roll and adhere to more of the uppermost leading page 83 (step 305). After the platform 15 has rotated a predetermined angle, the servo motor 45 raises the pickup arm 43 in a second direction to a predetermined height (step 306). The platform 15 continues to rotate causing the uppermost leading page 83 to be peeled from the page lifter 51. The platform 15 continues to rotate until the book 80 is positioned under the hood 62, ready for image capture (step 308). When the platform 15 reaches this image capture orientation, the motor 33 is temporarily paused while the remote camera shutter release module 104 is activated and the electronic switch 124 is momentarily closed (step 310). The remote camera shutter release module 104 commands the camera 201 to capture an image of the open book 80. Alternatively, the electronic switch 124 could be connected to an camera 201 which can be triggered by a switch closure. For example, many smartphone cameras can be triggered by depressing an external volume control button on the headphone cord. By simulating a shutter button, the momentary closure of electronic switch 124 commands the camera 201 to capture an image of the open book 80. The controller 71, magnetic field sensor 72, index magnet 20, and electronic switch 124 are a means for generating an electrical signal dependent on the rotational angle of the platform 15.

In the previously described embodiments, the controller 71 triggers the image capture device when the book 80 is in the proper position for imaging; the controller 71 commands the camera 201 or in other words, the controller 71 is the "master" and the camera 201 is the "slave". In other embodiments, the camera 201 is the "master" and the controller 71 is the "slave". In these embodiments, the camera 201 captures an image and then subsequently sends an "advance" signal to the controller 71 to advance to the next page (step 313). Using an intervalometer or interval timer function, the camera 201 then waits a predetermined amount of time before automatically capturing the next image. For example, the camera 201 could capture an image of the current page, send an "advance" signal to the controller 71, then wait 10 seconds, for example, for the platform 15 to complete a revolution before capturing an image of the next page. The controller's 71 mode of operation ("master" or "slave") could be set at the factory or by a user-accessible toggle switch connected to the controller 71.

The "advance" signal could be a predetermined infrared light digital code (similar to that which is transmitted by a television remote control), an audio signal such as a "beep", a radio-frequency (RF) transmission, or even a burst of visible light produced by the camera 201 flash. In these embodiments, a transducer 120 is connected to an amplifier 121 which is connected to the microcontroller 123. The transducer 120 converts the "advance" signal sent by the camera 201 into an electrical signal which is amplified by the amplifier 121 before signal processing and detection by the microcontroller 123. Depending on the nature of the "advance" signal, the transducer 120 could be a microphone for detecting audio signals, or a phototransistor for detecting visible or infrared light. In other embodiments, the transducer 120 and amplifier 121 combination are contained in a radio-frequency (RF) module designed to receive messages using common RF communication standards such as IEEE 802.15.1 (Bluetooth) or IEEE 802.11 (Wi-Fi). The transducer 120, amplifier 121, microcontroller 123, motor driver 103, and motor 33 are a means for controlling the rotation of the platform 15 via an external wireless signal. If the external imaging device produces an "advance" signal such as an audible "beep" tone, for example, the transducer 120, amplifier 121, microcontroller 123, motor driver 103, and motor 33 are a means for using the external device to trigger the rotation of the platform 15.

A smartphone running a custom intervalometer-type program (app) could act as the "master" described above with the controller 71 acting as the "slave". The smartphone could capture images with its built-in camera and then send an "advance" signal to the controller 71. The "advance" signal could be an audible tone, a flash of light from the smartphone camera's flash, or a radio-frequency data transmission. An advanced smartphone program could perform optical character recognition (OCR) of captured data in the time between image captures while the platform 15 is rotating.

There are various possibilities regarding the design of the page lifter 51. In some embodiments, a layer of sticky polyurethane gel, similar to the gel found in reusable lint rollers, is used in place of adhesive tape 55. The width of the page lifter 51 could be increased to augment the adhesion surface area and adhesion force, if necessary. The polyurethane gel would be cleaned periodically by the operator as needed.

Figure 9:
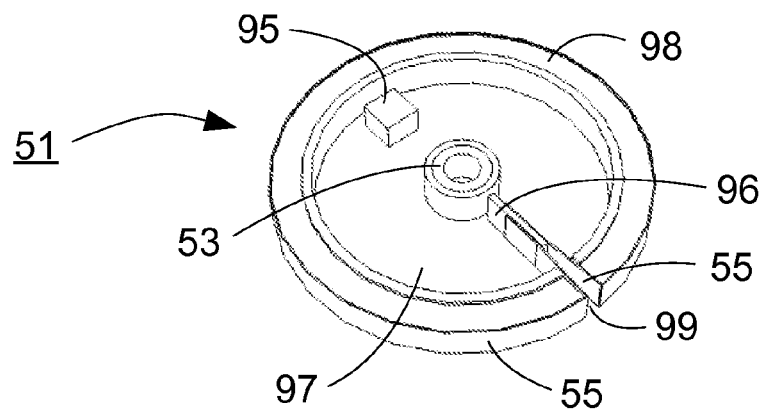
FIG. 9 is a perspective side view of an alternate embodiment of the page lifter.

FIG. 9 shows a perspective side view of an alternate embodiment of an adhesive tape-based page lifter 51. A wheel 97 of predetermined diameter has a bearing 53 mounted at its center. A tire 98 of predetermined dimensions is mounted on the circumference of the wheel 97. The tire 98 is made of a substantially resilient material such as, but not limited to, rubber, foam rubber, or cork. A loop of pressure-sensitive adhesive tape 55 is mounted to the tire 98. The width of the adhesive tape 55 is slightly larger than the width of the tire 98. The ends of the loop are routed through a slot 99 where they adhere to an anchor point 96 which is fixed to the wheel 97. The anchor point 96 provides a surface area to which the ends of the loop of adhesive tape 55 may be affixed. The loop of adhesive tape 55 is under slight tension which prevents the loop from slipping off of the tire 98. The adhesive on the adhesive tape 55 faces outward, away from the center of the wheel 97. A counterweight 95 of predetermined mass is fixed to the wheel 97. The counterweight 95 keeps the page lifter 51 balanced by being positioned opposite the anchor point 96.

Figure 8:
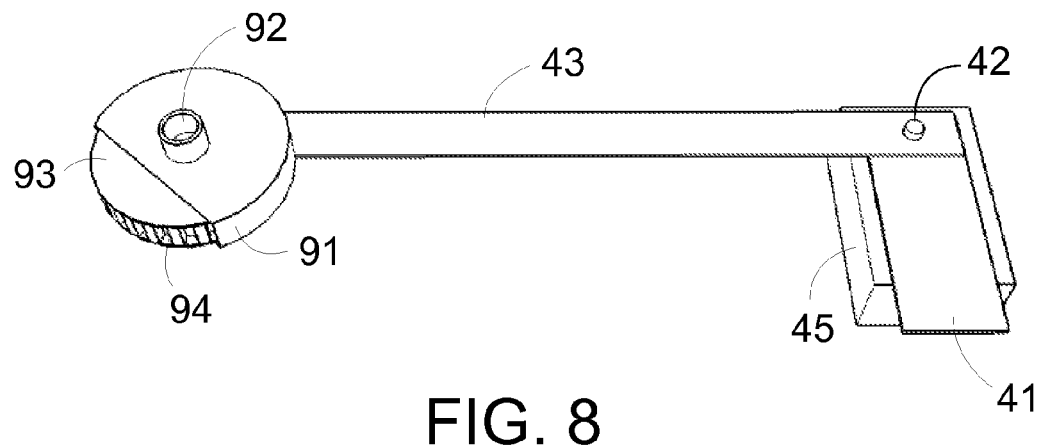
FIG. 8 is a bottom perspective view of a vacuum-based page lifter and pickup arm.

Other embodiments use the vacuum-based page lifter shown in FIG. 8. A shroud 91 is fixed to the pickup arm 43. A hollow axle 92, which also acts as a vacuum attachment port, is mounted to the shroud 91. A hollow wheel 93 of predetermined diameter is rotationally mounted to the hollow axle 92. The hollow wheel 93 has perforations or openings 94 around its circumference. The wall of the hollow axle 92 has an opening which connects the internal space of the hollow axle 92 to the internal space of the hollow wheel 93. An external vacuum source (not shown) is connected to the hollow axle 92. The shroud 91 surrounds the hollow wheel 93 such that a predetermined arc of the hollow wheel 93 is exposed, concentrating the suction at the bottom-front edge. The pickup force is determined by the width of the hollow wheel 93, the size and number of the openings 94, and the strength of the vacuum source.

Advantages

From the description above, a number of advantages of some embodiments of the system become apparent:

(a) Some embodiments of the system require only a single motor and minimal mechanical parts resulting in reduced cost. The estimated system cost is so low that ownership is no longer limited to institutions, i.e. individuals, such as researchers, can afford to purchase it.

(b) Some embodiments of the system require only a single motor and fewer moving mechanical parts than the prior art resulting in higher reliability.

(c) Some embodiments of the system have a minimal operating cost as they consume only a short length of inexpensive, commercially available adhesive tape per book. Adhesive tape is available with many different grades of adhesive with some tapes leaving behind no residue. The appropriate tape may be selected according to the type of paper used in the book to be scanned.

(d) Some embodiments of the system utilizing a tacky page lifter exhibit quiet operation which is a desirable characteristic for most users of the system.

(e) Some embodiments of the system utilize a single small electric motor, allowing portable, battery-powered operation.

(f) The operator may use his or her existing camera for image capture, making the system more affordable. This is also desirable for public installations of the system for anti-theft and privacy reasons. For example, the operator would mount his camera on the system and then proceed to scan the book of interest. The image data is captured directly by the operator's camera without any second-party involvement.

(g) Following initial setup of the book to be scanned, the system allows unattended operation.

CONCLUSION, RAMIFICATIONS, AND SCOPE

Traditional book scanning requires manual page turning, which is labor-intensive, costly, and monotonous. An automatic page turning system helps relieve the monotony of manual page turning. Existing commercial book scanners with automatic page turning capability are complex and expensive. There has been a long-standing need for an affordable book scanning system with automatic page turning capability. The embodiments described above are low-cost because they combine a simple page turning mechanism with commercially available image capture devices which offer high-performance at an affordable cost.

While the descriptions above contain many specificities, these should not be construed as limitations on the scope, but rather as examples of several embodiments. Many other variations are possible. In various embodiments, additional features can be added to the system. For example, a page lifter 51 which relies on electrostatic force to attract the top page may be used. An electrostatic page lifter would operate quietly and not consume adhesive tape.

The rotating platform 15 need not be round. It may, for example, be rectangular in shape with the ability to mount two books, one on either end of the platform. Two books can be scanned at the same time with such a configuration.

A foldable platform 15 makes the system easier to transport and store. For example, two semi-circular panels joined by hinges form such a folding platform 15. This variation of the system is suitable for home use where it would typically be folded and stored between uses.

A reversible motor driver 103 allows the system to reduce potential bunching of the uppermost pages by gently moving the book 80 back and forth under the hood 62 prior to pausing for image capture.

Two or more cameras 201 can be used to capture images. One camera can be aimed at the left-hand side of the open book 80 and a second camera can be aimed at the right-hand side. This arrangement allows for higher quality imaging.

Hook and loop fasteners, such as Velcro Brand, can be used as a means for retaining the book 80 in an initially set position on the platform 15. For example, the platform 15 surface can be selectively covered with areas of loop fastener material. Straps using the mating hook fasteners can then be used to hold the front and back covers of the open book 80 flush against the platform 15.

The steel sheet 19 on the surface of the platform 15 can be replaced with a material possessing a high friction coefficient or a tacky material such as a polyurethane gel sheet. This is an alternate means for retaining the book 80 in an initially set position on the platform 15.

An optical lens, such as a Fresnel lens, may be attached to the hood 62 to distort the images captured by the camera 201. This predistortion is used to enlarge or optically shift the text in the area close to the spine of the book 80.

A directed jet of pressurized air can be used to restrain the pages while the platform rotates, i.e. the functions of the restraining arm 66 and hood 62 are performed by pressurized air jets directed downwards towards the pages of the open book 80. The jet nozzle can be rotationally fixed to the center of the platform 15, at a predetermined height, such that the air jet is always aimed at the book 80 as the platform 15 rotates.

A transparent surface, such as glass, can be suspended a predetermined height above and parallel to the hood 62 to provide support to an imaging device such as a smartphone. The smartphone can then be laid directly on the glass surface with its camera facing down for book imaging.

The shape of the hood 62 can be modified to also provide the restraining function of the restraining arm 66. For example, an L-shaped hood 62 covering the entire platform 15 except for a page-sized section located below the page lifter 51 restrains the pages of the open book 80 while the platform 15 rotates in addition to while the open book 80 is being imaged. This L-shaped hood 62 can be cantilevered over the platform 15. The fixed end of the cantilever is hinged to allow access to the platform 15 to set up the book 80 for imaging.

The means for moving the page lifter 51 up and down depending on the rotational angle of the platform 15 can be based on a cam-shaped platform 15. For example, the platform 15 can be round except for a substantial notch where the gap section 18 of the rim 16 would normally be located if a rim 16 were used. The boss 44 is in the shape of a wedge. The base of the wedge is fixed to the bottom of the pickup arm 43 such that the inclined face of the wedge faces the platform 15 and the pointed end of the wedge points away from the page lifter 51. The wedge is aligned such that it contacts the top edge of the platform 15 and the long side of the wedge's base is substantially tangent to the platform 15 perimeter. As the platform 15 rotates, the boss 44 is dragged along the top edge of the platform 15. When the boss 44 encounters the notch section, the boss 44 falls through the notch, the pickup arm 43 drops, and the page lifter 51 is dropped onto the book 80. As the platform 15 continues to rotate, the inclined face of the wedge-shaped boss 44 encounters the end of the notch section and eventually, the boss 44 is lifted up and out of the notch.

Accordingly, the scope should be determined not by the embodiments illustrated, but by the appended claims and their legal equivalents.

I claim:

1. A system for automatically sequentially turning the pages of an open book, booklet, magazine, or the like comprising:
   a rotatable, substantially horizontal platform upon which a book or the like may be positioned in a predetermined location in an open state so as to expose an uppermost leading page, said platform having an axis of rotation substantially perpendicular to said platform;
   a motor for producing rotational energy;
   first means for controllably transferring rotational energy from said motor to said platform;
   a page lifter; and
   second means, including an arm connected to said page lifter, for moving said page lifter between a first position and second position, dependent on the rotational angle of said platform, said first position with said page lifter in contact with said uppermost leading page, and said second position with said page lifter a predetermined distance normal to the surface of said platform;

whereby the top page of said open book or the like will be turned.

2. The system in claim 1 wherein said page lifter comprises a resilient wheel of predetermined diameter and predetermined width, said wheel having a tacky peripheral surface.

3. The system in claim 1 wherein said page lifter comprises a resilient wheel of predetermined diameter and predetermined width, said wheel capable of accepting a loop of adhesive tape on the circumference of said wheel, the tacky side of said adhesive tape facing away from the center of said wheel.

4. The system in claim 1 wherein said page lifter comprises a hollow wheel of predetermined diameter and predetermined width, said wheel defining an internal space connected to a vacuum source and formed with a plurality of openings communicating said internal space with the exterior circumferential surface of said wheel.

5. The system in claim 1 further including a substantially transparent hood, said hood suspended a predetermined distance above said platform via one or more support structures.

6. The system in claim 1 further including a substantially horizontal arm fixed a predetermined distance above said platform for restraining said pages while said platform is being rotated from a first predetermined rotational angle to a second predetermined rotational angle.

7. The system in claim 1 further including an electronic circuit for generating a wireless signal dependent on the rotational angle of said rotatable platform, said wireless signal capable of controlling an external image capture device, allowing said system to operate automatically in coordination with said image capture device to sequentially capture images of the pages of said book or the like.

8. The system in claim 1 further including an electronic circuit for producing an electrical signal dependent on the rotational angle of said rotatable platform, said electrical signal capable of controlling an external image capture device, allowing said system to operate automatically in coordination with said image capture device to sequentially capture images of the pages of said book or the like.

9. The system in claim 1 further including a third means, comprising a controller and a transducer, for controlling the rotation of said platform via an external wireless signal, said wireless signal emanating from an external image capture device, allowing said system to operate automatically in coordination with said image capture device to sequentially capture images of the pages of said book or the like.

10. The system in claim 1 further including an electronic circuit for triggering an image capture device dependent on the rotational angle of said rotatable platform.

11. The system in claim 1 further including a fourth means for retaining said book in an initially set position on said rotatable platform.

12. The system in claim 1 further including an image capture device.

13. The system in claim 2 further including:
a substantially transparent hood, said hood suspended a predetermined distance above said platform via one or more support structures;
a substantially horizontal arm for restraining said pages while said platform is being rotated from a first predetermined rotational angle to a second predetermined rotational angle;
a circuit for triggering an image capture device dependent on the rotational angle of said rotatable platform; and
a fourth means for retaining said book in an initially set position on said rotatable platform.

14. The system in claim 3 further including:
a substantially transparent hood, said hood suspended a predetermined distance above said platform via one or more support structures; and
a circuit for triggering an image capture device dependent on the rotational angle of said rotatable platform.

15. A method of mechanically turning the pages of a bound volume having a spine such as a book, booklet, magazine, or the like for reading or imaging, comprising:
a. providing a platform for supporting said open book in a predetermined orientation, said platform rotatable about a first center axis;
b. providing a page lifter with a second center axis, said second center axis substantially orthogonal to said first center axis;
c. rotating said platform in a first direction to a third predetermined rotational angle whereby said open book is positioned below said page lifter;
d. moving said page lifter into contact with the uppermost page of said open book, said page lifter substantially orthogonal to said platform;
e. rotating said platform incrementally in said first direction, said page lifter holding fast to said uppermost page, said uppermost page curling away from neighboring pages as said page lifter rotates;
f. moving said page lifter in a direction substantially normal to said platform, to a predetermined distance away from said platform, said page lifter holding fast to said uppermost page;
g. rotating said platform in said first direction to a fourth predetermined rotational angle causing said uppermost page to be peeled away from said page lifter;
h. rotating said platform in said first direction to a fifth predetermined rotational angle where said open book is positioned in view of a reader or an external imaging device; and
i. pausing rotation of said platform;
whereby said uppermost page is turned.

16. A method as in claim 15, further including providing restraining means for restraining said pages in said open book while said platform is rotating from said fourth rotational angle through said fifth rotational angle to said third rotational angle.

17. A method as in claim 15, further including providing a controller for controlling motorized rotation of said platform.

18. A method as in claim 17, further including triggering said imaging device to capture an image when said platform is paused.

19. A method as in claim 17, further including providing a transducer for detecting signals produced by said external imaging device to trigger motorized rotation of said platform.

* * * * *